July 21, 1959 P. R. SELTMAN 2,895,511
GROUND SURFACED LAMINATED PAPER TUBES
Filed Oct. 14, 1955

INVENTOR.
PAUL R. SELTMAN.
BY
DES JARDINS, ROBINSON & KEISER.
HIS ATTORNEY.

United States Patent Office — 2,895,511 — Patented July 21, 1959

2,895,511

GROUND SURFACED LAMINATED PAPER TUBES

Paul R. Seltman, Covington, Ky., assignor to Crescent Paper Tube Company, Inc., Covington, Ky., a corporation of Kentucky Application October 14, 1955, Serial No. 540,519

3 Claims. (Cl. 138—76)

This invention relates to ground surfaced laminated paper tubes having a helically wound exterior ply, the adjacent side edges of which are ground into abutting relationship, and its manufacture, and it pertains particularly to a tube resulting from having lapped side margins of the exterior helical ply ground away and napped to bring the resulting ground side edges into closely abutting relationship and matted without any unevenness or irregularity at the joint and with the exposed surface of the joint eliminated by grinding the surface fibers of the ply into matting and interlacing relationship, thereby integrating the abutting side edges in continuity with the entire surface area.

It has also been found that grinding the exterior surface of the paper core, irrespective of its structure, causes the starting end of the film sheet to adhesively cling thereto. The grinding provides static electricity in the ground surface to provide static attraction for the starting end of the film sheet to be wound about the core.

Laminated paper tubes are used as cores for winding plastic sheets thereon. Plastic sheets are deformable and conform to the surface contour of the exterior surface of the core, more especially where said plastic sheets are of very thin ply such as film. Accordingly, it is desirable to have the exterior surface of the core as smooth and even as possible. Laminated tube cores with the paper wound convolute do not present any problem since the outer terminal end can be skived to lie flat without any appreciable irregularity in the joint resulting from the lap of the terminal end. Moreover, this terminal lap joint is a single one substantially parallel with the axis of the tube, and any resulting deformity in the wound plastic sheet is less pronounced and conspicuous than if such deformities were multiple and diagonally disposed as would result from helical joints in the core. It is not feasible to skive the side edges of the helical winding ply, and it is impossible to bring these side edges in closely abutting relationship whether or not they be skived. The side edges are so irregular and uneven that there are elevations and depressions in the joints which would, of course, be as objectionable as lapped joints. The resulting joint is a very pronounced helical recess.

Accordingly, one of the main objects of this invention is a laminated paper tube with the adjacent side edges of the exterior helical ply ground into closely abutting relationship.

Another object of the invention is a laminated paper tube with the joint seams of the outer helical ply smooth and even.

Another object of the invention is a laminated paper tube having the entire surface of the outer helical ply and the joint seams ground into an intregated structure.

Still another object of the invention is a laminated paper tube with the joint seams of the outer helical ply integrated by matting and interlacing the ends of the ground fibers.

A still further object of the invention is grinding the exterior surface of the fiber core to charge it with static electricity for statically adhering thereto the starting end of the film sheet to be wound upon the core.

Further objects, and objects relating to details of construction and economics of operation, will readily appear from the detailed description to follow. In one instance, the objects of the invention have been accomplished by the device and means set forth in the following specification. The invention is clearly defined and pointed out in the appended claims. A structure constituting a preferred embodiment of the invention is illustrated in the accompanying drawings, forming a part of this specification, in which:

Referring specifically to the drawings in which like numerals designate like parts, numeral 2 is a laminated paper tube with any number of plies. The inner ply 3 is helically wound with its side edges in abutting relation, resulting in a spiral joint 4 which is depressed below the surface of the ply. While the inner ply is illustrated as helically wound, if could, of course, be wound convolute, that is, non-helically. The present invention has to do with laminated paper tubes in which the exterior ply 5 is wound helically, irrespective of how the other under plies are wound or how many there may be.

Figure 1:
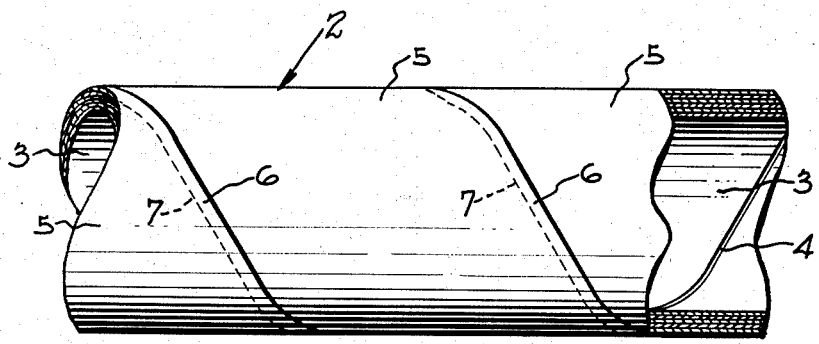
Fig. 1 is a side view of a laminated paper tube, with a wall portion broken away, having an inner helical ply wound with its side edges in abutting relation, and an outer helical ply having side margins lapped.
Figure 2:
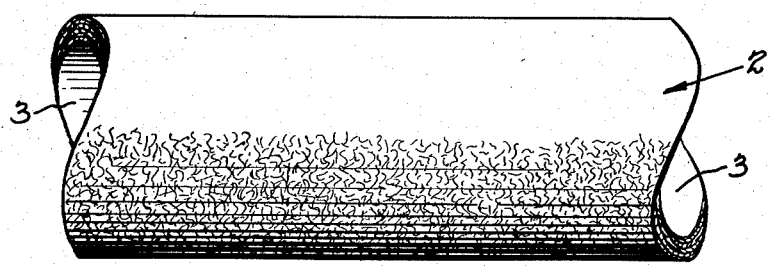
Fig. 2 is a side view of the laminated paper tube of Fig. 1 with the lapped side margins of the outer ply ground away to integrate the fibers of the abutting edges.
Figure 3:
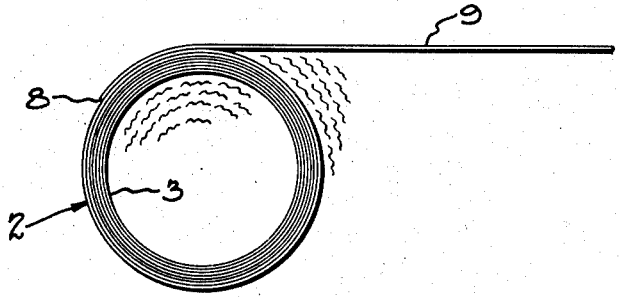
Fig. 3 is a detailed view showing the starting end of a film sheet statically adhered to the exterior surface of the ground core preliminary to being wound thereabout.

This exterior ply is wound (Fig. 1) with one of the adjacent side margins 6 lapped over the other one. Thereafter, this overlapping portion of lap 6 is ground away to bring the adjacent side edges 7 in abutting relationship. This not only removes the lap 6 of the helical ply but mats and interlaces the ends of the fibers of the ground end into the joint and into the abutting edge so that the joint is not only smooth and even in continuity but is integrated by reason of the fibers being matted and interlaced across the joint so that said helically wound ply is continuous and uninterrupted at the juncture.

In practice, it is advantageous to grind the entire surface of the outer helical ply, thereby giving a napped or teaseled surface to the entire outer surface as well as to the joint portions.

The exterior ply of the tube together with the lapped side edge portions may be ground with any suitable means such as abrasive paper or the like which will remove the lap and teasel the fibers into a napped surface.

The laminated tube with the outer surface ground to remove the lap and nap the fibers is satisfactory for use without further treatment although, if desired, it may be treated with a thin solution of adhesive to adhere the loosened ends or nap of the fibers resulting from the grinding. However, the ground surface is advantageously left untreated with the loosened ends of the fibers left free in the ground surface as they have an attraction or affinity for the film sheet so that the starting end of the film sheet will cling thereto. Furthermore, the ground surface is charged with static electricity to statically attract the starting end of the film sheet. The unground surface of the core does not possess any of these characteristics. The static and ground characteristics can be provided irrespective of its structure. In other words, if only a ground and static surface is desired for the core, the core may be non-laminated or laminated, and, if laminated, the laminations may be helical or convolute, or a combination of both.

A film sheet 9 of plastic material, such as polyvinyl resin, is wound about the core. Its starting end 8 will statically cling to the ground surface of the core, thereby permitting it to be spread smooth and even without wrinkling such as would likely occur if the starting end had to be held in position until lapped by the succeeding convolution of the wound sheet.

I am aware that there may be various changes in details of construction without departing from the spirit of my invention, and, therefore, I claim my invention broadly as indicated by the appended claims.

Having thus described my invention, what I claim as new and useful and desire to secure by United States Letters Patent is:

1. The combination of a fiber core having a ground exterior surface charged with static electricity, and a convolute winding of film sheet about the core with its starting end adhered to said core surface by means of static electricity.

2. The combination of claim 1 in which the film sheet is plastic material.

3. A method of winding film sheets about a fibrous core comprising grinding the exterior surface of the core to loosen the ends of the fibers on the core surface and charge said surface with static electricity, statically adhering the starting end of a film sheet to the ground core surface, and then winding the sheet about the core.

References Cited in the file of this patent

UNITED STATES PATENTS

| | | |
|---|---|---|
| 1,634,492 | Dunlap | July 5, 1927 |
| 2,181,035 | White | Nov. 21, 1939 |
| 2,256,082 | Feurt | Sept. 16, 1941 |
| 2,293,887 | Chamberlain | Aug. 25, 1942 |
| 2,623,445 | Robinson | Dec. 30, 1952 |
| 2,701,765 | Codichini et al. | Feb. 8, 1955 |
| 2,711,982 | Straka | June 28, 1955 |